United States Patent
Suzuki (10) Patent No.: US 8,365,011 B2
(45) Date of Patent: Jan. 29, 2013

(54) DATA TRANSMISSION DEVICE, AND METHOD AND COMPUTER READABLE MEDIUM THEREFOR

(75) Inventor: Takanobu Suzuki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 999 days.

(21) Appl. No.: 12/399,911

(22) Filed: Mar. 6, 2009

(65) Prior Publication Data

US 2009/0235111 A1    Sep. 17, 2009

(30) Foreign Application Priority Data

Mar. 14, 2008   (JP) .................................. 2008-065178

(51) Int. Cl.
  *G06F 11/00* (2006.01)
(52) U.S. Cl. ......................................................... 714/4.5
(58) Field of Classification Search ................ 714/1, 4.5
  See application file for complete search history.

(56) References Cited

U.S. PATENT DOCUMENTS

| | | | | |
|---|---|---|---|---|
| 5,522,046 A * | 5/1996 | McMillen et al. | ............ | 709/239 |
| 6,704,812 B2 * | 3/2004 | Bakke et al. | ..................... | 710/38 |
| 7,345,999 B2 * | 3/2008 | Su et al. | ......................... | 370/231 |
| 2005/0081080 A1 * | 4/2005 | Bender et al. | ..................... | 714/2 |
| 2006/0039037 A1 | 2/2006 | Shibata | | |
| 2007/0286236 A1 * | 12/2007 | DeFord | ......................... | 370/475 |
| 2008/0209297 A1 * | 8/2008 | Chandra et al. | ................ | 714/748 |
| 2010/0251058 A1 * | 9/2010 | Chandra et al. | ................ | 714/751 |
| 2011/0128973 A1 * | 6/2011 | Yonge et al. | ................... | 370/469 |

FOREIGN PATENT DOCUMENTS

| JP | 2000-196651 A | 7/2000 |
|---|---|---|
| JP | 2006-060499 A | 3/2006 |
| JP | 2007-081528 A | 3/2007 |

OTHER PUBLICATIONS

Japan Patent Office; Notification of Reasons of Rejection in Japanese Patent Application No. 2008-065178 mailed on Jun. 8, 2010.

\* cited by examiner

*Primary Examiner* — Bryce Bonzo
(74) *Attorney, Agent, or Firm* — Baker Botts L.L.P.

(57) ABSTRACT

A data transmission device, configured to be connected with a plurality of terminal devices via a network, includes a data transmission unit transmitting data sequentially to the terminal devices, a determining unit determining a transmission method for transmitting the data to each of the terminal devices, and a controller configured to, when the data transmission unit fails to transmit the data to a first one of the terminal devices in a first transmission method, control the determining unit to determine a second transmission method for retrying to transmit the data to the first terminal device, and control the data transmission unit to retry to transmit the data to the first terminal device in the second transmission method after the data transmission unit tries to transmit the data to terminal devices other than the first terminal device to which devices among the terminal devices the data has not been successfully transmitted.

13 Claims, 10 Drawing Sheets

DATA TRANSMISSION DEVICE, AND METHOD AND COMPUTER READABLE MEDIUM THEREFOR

CROSS-REFERENCE TO RELATED APPLICATION

This application claims priority under 35 U.S.C. §119 from Japanese Patent Application No. 2008-065178 filed on Mar. 14, 2008. The entire subject matter of the application is incorporated herein by reference.

BACKGROUND

1. Technical Field

The following description relates to one or more data transmission techniques adopted to transmit the same data sequentially to a plurality of terminal devices via a network.

2. Related Art

Scanning devices have been known that are adopted to transmit to terminal devices data created by scanning images (for example, see Japanese Patent Provisional Publication No. 2006-60499). Among such devices configured to transmit data to terminal devices (data transmission devices), there is a device provided with a function to send the same data to a plurality of terminal devices at a time. When two or more terminal devices are designated as data transmitted destinations, the data transmission device first establishes a connection with one of the terminal devices, and cancels the connection after confirming that data transmission is completed. After completing the data transmission to the one of the terminal devices, the data transmission device establishes a connection with a next one of the terminal devices.

SUMMARY

When the data transmission is carried out via a Local Area Network (LAN), the data transmission may not be successfully achieved. For example, the data transmission fails when a terminal device as a data transmitted destination is powered off, when the data transmitted destination does not have enough storage capacity left, or when a data transmission route to the data transmitted destination is closed. In addition, when there is no response from a terminal device connected with the data transmission device, the data transmission device is compelled to wait awhile. Further, when the data transmission with a terminal device is not successfully achieved, the data transmission device retries the data transmission to the terminal device. However, when the data transmission device repeats waiting or retrying two or more times for the data transmission to the same terminal device, it causes a delay in data communication to other terminal devices.

Aspects of the present invention are advantageous to provide one or more improved data transmission devices, methods, and computer readable media adopted to rapidly transmit data to a plurality of terminal devices via a network.

According to aspects of the present invention, a data transmission device is provided which is configured to be connected with a plurality of terminal devices via a network. The data transmission device includes a data transmission unit configured to transmit data sequentially to the plurality of terminal devices, a determining unit configured to determine a transmission method for transmitting the data to each of the plurality of terminal devices, and a controller configured to, when the data transmission unit fails to transmit the data to a first one of the plurality of terminal devices in a first transmission method, control the determining unit to determine a second transmission method for retrying to transmit the data to the first terminal device, and control the data transmission unit to retry to transmit the data to the first terminal device in the second transmission method after the data transmission unit tries to transmit the data to terminal devices other than the first terminal device to which devices among the plurality of terminal devices the data has not been successfully transmitted.

In some aspects of the present invention, the data transmission device is configured to transmit the same data sequentially to the plurality of terminal devices connected therewith via the network. When the data transmission device fails to transmit the data to a first one of the plurality of terminal devices, after trying to transmit the data to all the other terminal devices to which the data has not been successfully transmitted, the data transmission device retries to transmit the data to the first terminal devices. In other words, the retry at the data transmission to the first terminal device is made not immediately after failing in the previous try at the data transmission but after trying the data transmission to each of the other terminal devices to which the data has not been successfully transmitted. Thus, even though the data transmission device fails in the data transmission to the first terminal device, the data transmission device can try to transmit the data to the other terminal devices without delay.

In some aspects of the present invention, the data transmission device may include a copy machine, a printer, a scanner, a facsimile machine, and a Multi Function Device (MFD) provided with at least one function of the above devices, which are configured to be connected with the LAN.

In some aspects of the present invention, optionally, the second transmission method may be different from the first transmission method in at least one of a transmission protocol and a data transfer route. In this case, the transmission protocol may be a protocol defined in the TCP/IP standard such as FTP, HTTP, an e-mail protocol, a Common Internet File System (CIFS) protocol. The data transfer route may be a route via a server. A retry at the data transmission in a transmission method different from that for the previous try is likely to make the data transmission successful more certainly, and thus the data transmission can be successfully achieved by a smaller number of retries.

According to aspects of the present invention, further provided is a method for transmitting data sequentially to a plurality of terminal devices via a network, which method includes the steps of transmitting the data to a first one of the plurality of terminal devices in a first transmission method, when the transmitting the data to the first terminal device in the first transmission method fails, determining a second transmission method for retrying to transmit the data to the first terminal device, and after trying to transmit the data to terminal devices other than the first terminal device to which devices among the plurality of terminal devices the data has not been successfully transmitted, retrying to transmit the data to the first terminal device in the second transmission method.

In some aspects of the present invention, the method adopted as above can provide the same effects as the aforementioned data transmission device.

According to aspects of the present invention, further provided is a computer readable medium having computer executable instructions stored thereon, which instructions cause a computer configured to be connected with a plurality of terminal devices via a network to perform the steps of transmitting data to a first one of the plurality of terminal devices in a first transmission method, when the transmitting the data to the first terminal device in the first transmission method fails, determining a second transmission method for retrying to transmit the data to the first terminal device, and after trying to transmit the data to terminal devices other than the first terminal device to which devices among the plurality of terminal devices the data has not been successfully transmitted, retrying to transmit the data to the first terminal device in the second transmission method.

In some aspects of the present invention, the computer readable medium adopted as above can provide the same effects as the aforementioned data transmission device.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

1. First Embodiment

Referring to the accompanying drawings, a data transmission device in a first embodiment will be described. The data transmission device in the first embodiment is a Multi-Function Device (MFD) 10 provided with a facsimile function, a copy function, a printer function, and a scanner function.

1-1. System Configuration

Figure 1:
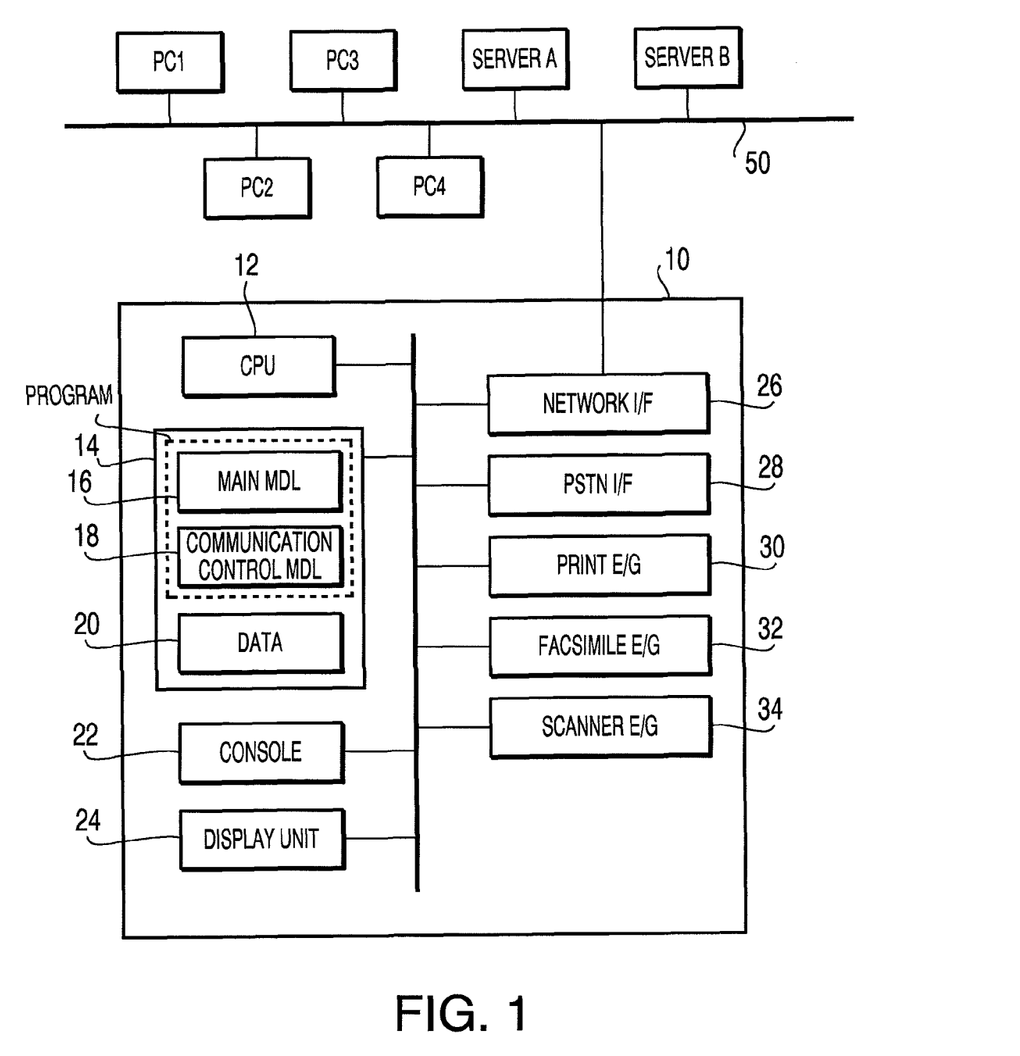
FIG. 1 is a block diagram schematically showing a configuration of a Multi-Function Device (MFD), which is connected with terminal devices and servers via a Local Area Network (LAN), in a first embodiment according to one or more aspects of the present invention.

FIG. 1 is a block diagram of the MFD 10. There are as well drawn other devices connected with the MFD 10 via a Local Area Network (LAN) 50. Besides the MFD 10, four terminal devices (a PC 1, a PC 2, a PC 3, and a PC 4) and two servers (a server A and a server B) are connected with the LAN 50. The server A and the server B may be connected with a Wide Area Network (WAN).

The MFD 10 is provided with a CPU 12, a storage 14, a console 22, a display device 24, a network interface 26, a Public Switched Telephone Networks (PSTN) interface 28, a print engine 30, a facsimile engine 32, and a scanner engine 34. Characters "I/F" and "E/G" shown in FIG. 1 denote "interface" and "engine," respectively. In addition, characters "MDL" shown in FIG. 1 denotes "module."

The CPU 12 is configured to control the MFD 10 in accordance with various programs stored on the storage 14. The programs stored on the storage 14 include a main module 16 and a communication control module 18. The main module 16 is a program adopted to take overall control of the MFD 10. A function of the communication control module 18 will be described later. The storage 14 stores various kinds of data as well. The console 22 is hardware adopted to accept a desired instruction inputted by a user therethrough.

The network interface 26 is hardware adopted to communicate with a terminal device or a server via the LAN 50. The PSTN interface 28 is hardware adopted to establish connection of the MFD 10 with a public telephone line (not shown) therethrough. The MFD 10 can perform facsimile data communication via the public telephone line. The print engine 30 is hardware for the print function. The facsimile engine 32 is hardware for the facsimile function. The scanner engine 34 is hardware for the scanner function.

1-2. Types of Methods for Data Transmission

The MFD 10 can transmit image data scanned, facsimile data received, copied data, or printed data to two or more terminal devices via the network 50. The MFD 10 can transmit data to the terminal devices in the following transmission methods.

FTP
HTTP
CIFS
e-mail
via server

The above FTP, HTTP, and e-mail are transmission methods defined on TCP/IP. The above CIFS is a protocol, established based on TCP/IP, for file sharing on the Internet. The FTP, HTTP, e-mail, and CIFS are data transmission methods of respective different protocols. When the transmission methods of FTP, HTTP, and CIFS are used, a terminal device is specified as a data transmitted destination by designating an identifier referred to as Uniform Resource Locator (URL) that is assigned to the terminal device. The above "via server" is a transmission method in which data is transmitted to a server designated and inform a terminal device that the data has been transmitted to the server designated. The terminal device, which receives the data from the server designated, receives the data from the MFD 10 as a result. In the case of the transmission method of "via server," it is possible to transmit data via different routes by designating different servers. For example, by designating different e-mail servers, the MFD 10 can transfer data via different routes even though a transmission method utilized is the same method "e-mail."

The MFD 10 stores data referred to as "Profile" for each destination terminal device. The "Profile" is one piece of the data 20 stored on the storage 14. The Profile has information regarding a transmission method for transmitting data to a corresponding terminal device. The information described in the Profile includes the following data.

Terminal device name: the terminal device name is, for example, an IP address or another name assigned to the IP address. Each terminal device is specified with the terminal device name.

URL assigned to terminal device: information for specifying a data transmitted destination when using the transmission methods of FTP, HTTP, and CIFS.

Server URL: information for specifying a server for data relay when using the transmission method "via server." For example, when the URL of the server A in FIG. 1 is designated, the data is transmitted to the terminal device via the server A. When the URL of the server B in FIG. 1 is designated, the data is transmitted to the terminal device via the server B. Therefore, by designating server URLs of different servers, a plurality of transmission methods with different data transmission routes can be described in the Profile.

E-mail address: information for specifying a data transmitted destination when using the transmission method of e-mail.

The terminal device name, the URL assigned to terminal device, the server URL, and the e-mail address are utilized as a destination for a terminal device to which the data is to be transmitted.

Priority: an order of priority for the transmission methods employed for the data transmission. When the MFD 10 performs data transmission a terminal device, a transmission method to which the highest priority is assigned is first employed. When the data transmission in the first employed transmission method is not successfully achieved, the MFD 10 retries the data transmission in a transmission method with the highest priority next to the priority of the first employed method. However, the MFD 10 does not necessarily select a transmission method in accordance with the priority. Rules for the MFD 10 to select a transmission method will be described later.

User name and password: a user name and a password for a transmission method that requires certification. Prior to data transmission, certification may be required for establishing communication with a destination terminal device. For example, it is possible to set a password on a protocol such as FTP, HTTP, and CIF. When a data transmission method with a password set is employed, the user name and the password are needed.

File name attached to transmitted data: a switch for selecting whether the MFD 10 automatically attaches a file name to transmitted data or employs a file name designated by the user.

Format of transmitted data

Information on destination to be notified of data transmission results (result notified destination information): the MFD 10 notifies a predetermined terminal device of results of the data transmission. The "results of the data transmission" includes the transmitted destination, the transmission date and time, information on the transmitted data, information about whether the transmission has been successfully done, an error code to specify the cause in the case of transmission failure. Further, the result notified destination information contains an identifier to specify the notified destination (e.g., the IP address or the e-mail address), a method for notifying of the results, and a password. As the method for notifying of the results, FTP, HTTP, or "e-mail" may be designated. The user can previously designate the aforementioned items of the information.

1-3. Processes by MFD

Figure 2:
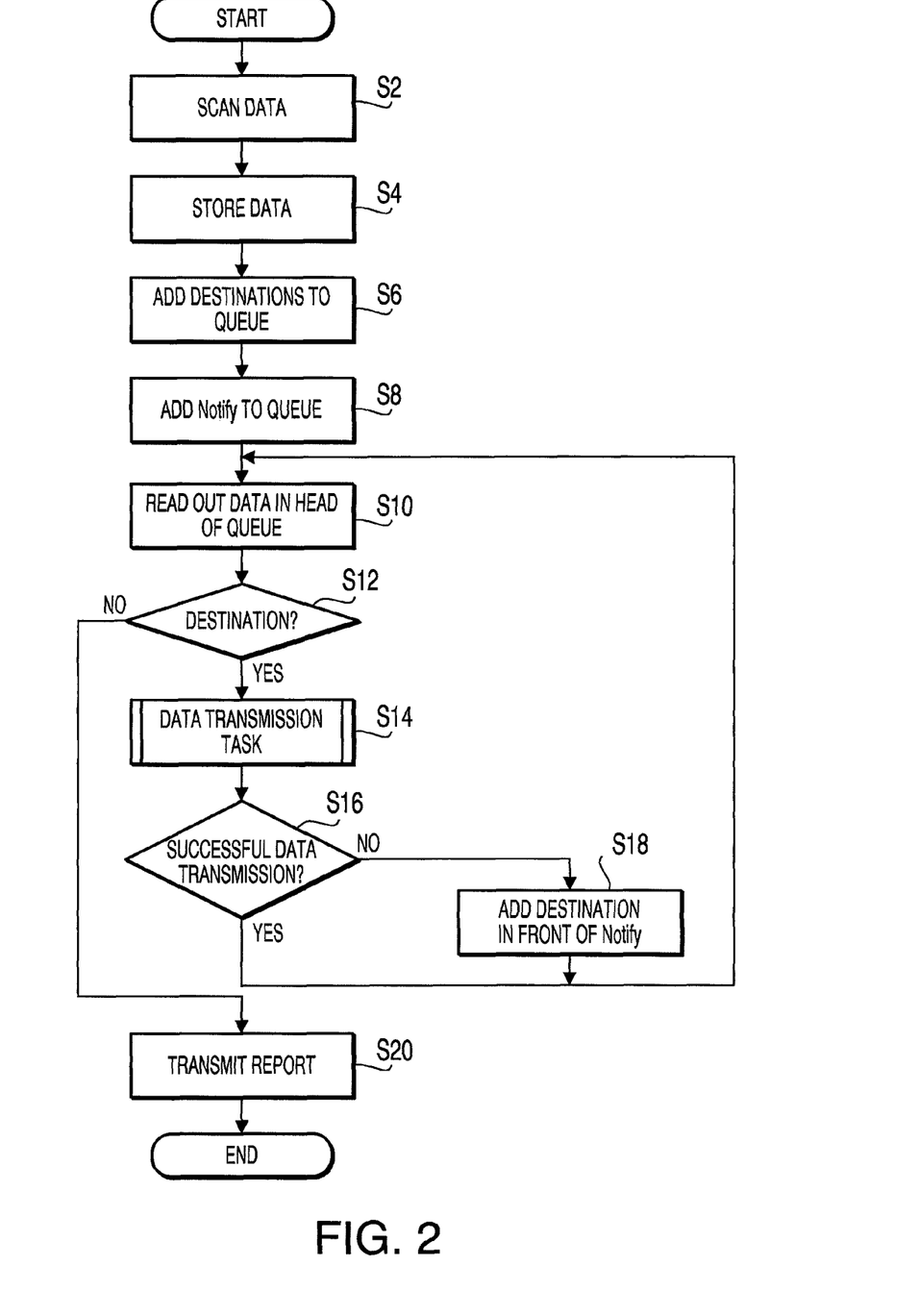
FIG. 2 is a flowchart showing a procedure of a main process to be executed by the MFD in the first embodiment according to one or more aspects of the present invention.
Figure 3:
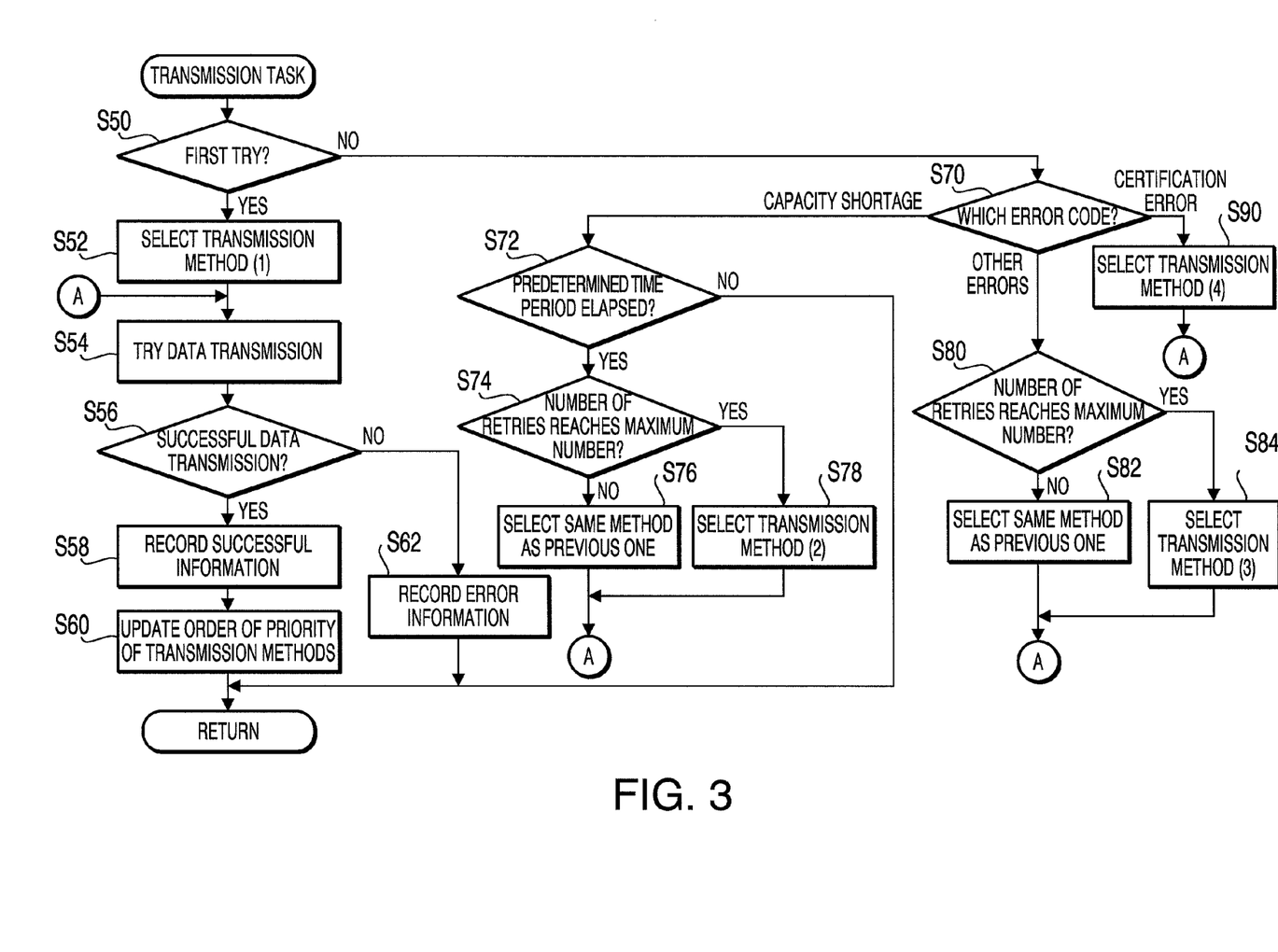
FIG. 3 is a flowchart showing a procedure of a data transmission process in the first embodiment according to one or more aspects of the present invention.

The MFD 10 is configured to sequentially transmit a single piece of data to a plurality of terminal devices. FIGS. 2 and 3 are flowcharts showing processes to be executed by the MFD 10 to transmit the data. FIG. 2 is a flowchart showing a main process for the data transmission. FIG. 3 is a flowchart of a "transmission task" (S14) shown in FIG. 2. The processes in FIGS. 2 and 3 are written in the communication control module 18 (see FIG. 1). In order to specifically explain the processes of the MFD 10, an assumption will be given that an instruction to make the MFD 10 scan an image and sequentially transmit the scanned image to the PC 1, the PC 2, the PC 3, and the PC 4 is inputted. The user inputs the instruction through the console 22 and the display device 24. The user designates "PC 1," "PC 2," "PC 3," and "PC 4" as destinations to which the image data is to be transmitted. The character strings "PC 1," "PC 2," "PC 3," and "PC 4" are terminal device names that represent the destinations.

The MFD 10 first scans image data in accordance with a user instruction (S2). Next, the MFD stores the image data scanned (S4). The image data scanned is stored on the storage 14.

Subsequently, the MFD 10 adds the plurality of destinations designated by the user to the end of a queue for a data transmission process (S6). The "queue" is one of basic data structures for computers. According to an order in which the destinations have been added to the queue, the MFD 10 tries to sequentially transmit the image data to the destinations. The MFD 10 adds a character string "Notify" behind the destinations (S8). The "Notify" is a reservation to execute an operation to transmit results of the data transmission to a predetermined terminal device. Namely, when "Notify" is taken out of the queue, the results of the data transmission are transmitted to the predetermined terminal device.

The MFD 10 reads out data stored in the head of the queue (S10). Incidentally, the data read out is deleted from the queue. When the data read out is a destination (S12: Yes), the MFD 10 designates the destination (the name of the destination terminal device) read out and starts the transmission task (S14). In the transmission task, the MFD 10 tries to transmit the image data to the designated destination. A general overview of the transmission task will be described below with reference to FIG. 3. When failing to transmit the image data (S16: No), the MFD 10 inserts the destination in front of "Notify" in the queue (S18). Namely, the MFD 10 adds the destination for the terminal device to which the MFD 10 fails to transmit the image data into a position next to the last destination included in the queue. Then the present process goes back to S10. When the data transmission is successfully achieved (S16: Yes), the present process goes back to S10 without executing S18. As long as the data in the head of the queue is a destination (S12: Yes), the MFD 10 repeatedly executes the steps S12 to S18. When the data in the head of the queue is not a destination (S12: No), namely, when the data in the head is the "Notify," the MFD 10 sends to the predetermined terminal device a report on results of the data transmission (S20). The MFD 10 sends the report in accordance with the result notified destination information written in the aforementioned Profile.

In the case of failure in the data transmission (S16: No), the MFD 10 adds the name of the destination terminal device in front of "Notify" in the queue (i.e., behind the last destination in the queue) (S18). Through this operation, in the case of failure in the data transmission, the MFD 10 retries the data transmission to the terminal device to which the MFD 10 has failed in the data transmission after trying to transmit the data to the other terminal devices. More specifically, when failing in the data transmission to a terminal device, the MFD 10 tries to transmit the data to all the other terminal devices left, and thereafter retries the data transmission to the terminal device to which the MFD 10 has failed to transmit the data. After the MFD 10 fails in the data transmission to a terminal device, the data transmission to a next terminal device is begun immediately. Therefore, even though the MFD 10 fails in the data transmission to the terminal device, the data transmission to the other terminal devices is not delayed.

1-4. Data Transmission Task

Referring to FIG. 3, the data transmission task will be described. Firstly, operations in S58 and S62 will be explained. Each time the MFD 10 tries the data transmission, the MFD 10 records results of the data transmission. When the data transmission is successfully achieved, the MFD 10 records that accordingly (S58). Meanwhile, in the case of failure in the data transmission, the MFD 10 records an error code to specify the cause of the failure in association with the destination (S62). These records will be referred to as a data transmission history. By referring to the data transmission history, the number of retries at the data transmission is determined. In the transmission task, the MFD 10 first refers to the data transmission history. Referring to the data transmission history, determines whether the data transmission to the destination has ever been tried, namely, whether the data transmission to the destination is the first try (S50). When the data transmission is the first try (S50: Yes), the MFD 10 selects a method for the data transmission (data transmission method) (S52). In S52, the MFD 10 refers to the received Profile of the destination terminal device, and selects the data transmission method to which the highest priority is assigned. Then, the MFD 10 tries the data transmission in the selected method (S54). When the data transmission is successfully achieved (S56: Yes), the MFD 10 makes a record of the successful data transmission. Thereafter, the MFD 10 edits the Profile such that the highest priority is assigned to the employed transmission method (S60). Meanwhile, in the case of failure in the data transmission (S56: No), the MFD 10 records an error code to specify the cause of the failure (S62). Then, the MFD 10 terminates the data transmission process and returns to the main process. It is noted that operations of selecting the transmission method in the steps S52, S90, S84, and S78 are performed under respective different rules. That is why the operations in the steps S52, S90, S84, and S78 are indicated in FIG. 3 with respective reference numbers "(1)," "(2)," "(3)," and "(4)" attached thereto in order to clarify that the operations have the respective different rules for selection is terminated Meanwhile, when it is determined in S50 that the data transmission is not the first try but a retry (S50: No), the present process goes to S70. The case where the determination in S50 is negative (S50: No) means a case where the data transmission has failed earlier. In this case, since an error code has been recorded in the data transmission history in S62, the MFD 10 refers to the error code and executes an operation depending on the sort of the error (S70). When the error code denotes capacity shortage, specifically, when the destination terminal device cannot receive the data because of capacity shortage, the present process goes to S72. In S72, the MFD 10 determines whether a predetermined time period has elapsed since the previous try at the data transmission. It is noted that the time of the previous try at the data transmission has been recorded as error information in the data transmission history in S62. When the predetermined time period has elapsed since the previous try at the data transmission (S72: Yes), the MFD 10 determines whether the number of retries reaches a predetermined maximum number of times (S74). When the number of retries does not reach the predetermined maximum number of times (S74: No), the MFD 10 selects the same transmission method as a previously tried method, and the present process goes to S54. Namely, the MFD 10 tries the data transmission in the same transmission method as the previous one. The "same method as the previous one" denotes a transmission method in which the data transmission has not been successfully achieved in the previous try. Meanwhile, when the number of retries reaches the predetermined maximum number of times (S74: Yes), the MFD 10 selects a transmission method with the highest priority next to the priority of the previous transmission method in accordance with the order of priority of the transmission methods written in the Profile (S78). Thereafter, the present process goes to S54.

Meanwhile, when it is determined in S72 that the predetermined time period has not elapsed since the previous try at the data transmission (S72: No), the data transmission process is terminated. When the determination in S72 is negative (S72: No), the determination in S16 (see FIG. 2) is negative (S16: No), and the destination terminal device is added in front of the character string "Notify" in the queue (S18). Then, after the data transmission is tried to the other terminal devices located in front in the queue, a task of data transmission to the destination terminal device which task has been added in S18 is again started. In the data transmission task, the operation in S72 is executed. Then, when the predetermined time period has elapsed, the present process goes to S74, in which the data transmission is tried (S54).

When the error code represents a certification error in S70 (S70: Certification Error), the present process goes to S90. In S90, the following operations are executed. When the previous data transmission has failed due to the certification error, the MFD 10 selects a transmission method in accordance with the following rule. The MFD 10 refers to the Profile of the destination terminal device. According to the order of priority written in the Profile, the MFD 10 selects a transmission method with the highest priority next to the priority of the previous transmission method (in which the data transmission has failed). When selecting a transmission method in S90, the MFD 10 neglects a transmission method that needs certification. Namely, neglecting a transmission method that needs certification, the MFD 10 selects a transmission method with the highest priority next to the priority of the previous transmission method. Then, the present process goes to S54. The MFD 10 tries the data transmission in the transmission method selected in S90. When the previous try at the data transmission has failed due to the certification error, a transmission method that differs from the previous transmission method but needs certification is not selected in S90. Thereby, it is avoided that a retry at the data transmission fails again due to the certification error.

When it is determined in S70 that the error code is not any of "Capacity Shortage" and "Certification Error" (S70: Other), the present process goes to S80. In S80, the MFD 10 determines whether the number of retries reaches a predetermined maximum number of times (S80). When the number of retries does not reach the predetermined maximum number of times (S80: No), the MFD 10 selects the same transmission method as a previously tried method (in which the previous try at the data transmission has fails) (S82). Meanwhile, when the number of retries reaches the predetermined maximum number of times (S80: Yes), the MFD 10 selects a transmission method with the highest priority next to the priority of the previous transmission method in accordance with the order of priority of the transmission methods written in the Profile (S84). Then, the present process goes to S54. The MFD 10 tries the data transmission in the transmission method selected in S82 or S84.

In S58, the MFD 10 writes, in the data transmission history, information that the data transmission has been successfully achieved. Meanwhile, in S62, the MFD 10 writes, in the data transmission history, information regarding the error that includes the error code. Information regarding the certification error is continuously recorded and referred to. On the other hand, error information regarding a capacity shortage error or a communication error, which may be resolved in a retry at the data transmission, is saved in the data transmission history, yet not referred to after such an error is resolved.

In the aforementioned data transmission task, the name of the destination terminal device is stored in the queue. When the data transmission fails, the error code may be stored in the queue as well as the name of the destination terminal device. In this case, the error code is stored in association with the name of the destination terminal device. The data transmission history stored in the queue may be written separately from the operation in S62.

In the aforementioned data transmission task, a transmission method is determined immediately before the retry at the data transmission (S52, S76, S78, S82, S84, and S90). However, the MFD 10 may determine a transmission method for the next retry at the data transmission immediately after failure in the data transmission. In such a case, in S18, the next transmission method may be stored in the queue along with the destination of the terminal device to which the data has not been successfully transmitted. In this case, the MFD 10 may store the next transmission method in association with the destination of the terminal device (the name of the destination terminal device). Thereby, at the time of a retry at the data transmission, the MFD 10 can begin the retry rapidly.

In the steps S78, S84, and S90 to determine a transmission method, the MFD 10 may not determine the next transmission method. For example, the MFD 10 does not determine the next transmission method when the lowest priority is assigned to the current transmission method, or when only one transmission method is written in the Profile. In such a case, a message that the data transmission has finally failed is written in the data transmission history, and the present process is terminated.

Further, when it is determined in S72 that the predetermined time period has not elapsed, namely, when a turn to retry the data transmission to the destination terminal device comes within the predetermined time period since the previous failure in the data transmission due to the capacity shortage error, the MFD 10 of the first embodiment adds the destination to the end of the destinations (in front of "Notify") and retries the data transmission in the same transmission method. Instead of such an operation, the MFD 10 may retry the data transmission in a transmission method with the highest priority next to the priority of the previous method when the turn of the retry comes before the predetermined time period has elapsed. Thereby, since the capacity shortage is expected to be resolved by the user of the destination terminal device by the time when the predetermined time period has elapsed, it is possible to obtain an advantage that the MFD 10 can retry the data transmission in the same transmission method with the same priority as the previous method employed for the previous data transmission that has caused the error. Further, the capacity shortage is not likely to be resolved by the user of the destination terminal device before the predetermined time period elapses. Therefore, by retrying the data transmission in a different transmission method, the MFD 10 may successfully achieve the data transmission to the destination terminal device without waiting for the predetermined time period to pass. Thus, it is possible to avoid delay in the data transmission.

1-5. Explanation of Queue and Multitask

Figure 4:
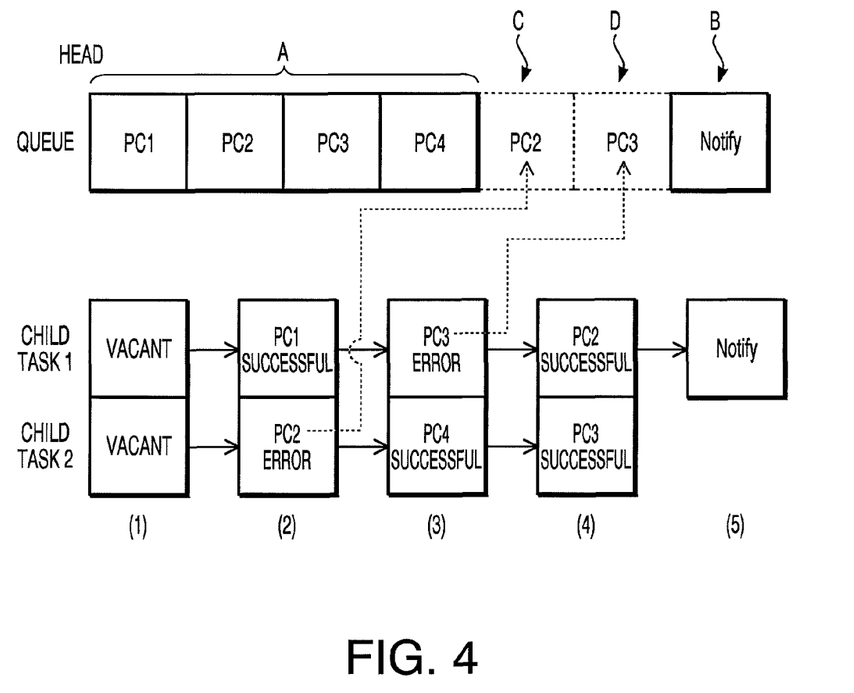
FIG. 4 is a diagram for explaining data transition in a queue and child tasks in the first embodiment according to one or more aspects of the present invention.

In the data transmission task, two or more child tasks are executed in parallel. Namely, the data transmission is performed in a multitasking manner. Relationship between the queue and multitasking will be described. FIG. 4 exemplifies data transitions in a queue and child tasks. The upper drawing in FIG. 4 shows the queue. Further, the lower drawing in FIG. 4 shows entry areas of the child tasks. The left side and the right side of the upper drawing are the head and the end of the queue, respectively, in FIG. 4. The "entry area" represents an area for a child task to which data is transferred from the queue. When data is inputted into an "entry area" of a child task, the child task executes an operation based on the data. Although the first embodiment gives an assumption that there are two child tasks (a child task 1 and a child task 2), any number of tasks may be possible.

When the user gives the MFD 10 an instruction to transmit the data with designation of the four terminal devices (the PC 1, the PC 2, the PC 3, and the PC 4), the destinations of the four terminal devices are sequentially added in the queue (see (A) in FIG. 4). In FIG. 4, the character strings such as "PC 1," "PC 2," "PC 3," and "PC 4" represent the destinations of the terminal devices. The character string "Notify" is added behind the last destination "PC 4" (see (B) in FIG. 4). At this time, (C) and (D) in FIG. 4 are not present in the queue. Further, the entry areas of the child task 1 and the child task 2 are vacant (see (1) in FIG. 4). The MFD 10 reads out the data "PC 1" in the head of the queue and sets the data in the entry area of the child task 1. After the data in the head of the queue is read out, the data is deleted from the queue. Namely, at this time, new data in the head of the queue is "PC 2." The MFD 10 reads out the new data in the head of the queue and sets the new data in the entry area of the child task 2 (see (2) in FIG. 4). The child task 1 tries the data transmission to "PC 1." The child task 2 tries the data transmission to "PC 2." Here, it is assumed that the data transmission is successfully achieved in the child task 1, and that the data transmission fails in the child task 2. The destination "PC 2" to which the data transmission has failed in the child task 2 is added behind the last destination "PC 4" (in front of "Notify") in the queue (see (C) in FIG. 4).

When the data transmission to "PC 1" is completed, new data "PC 3" in the head of the queue is set in the entry area of the child task 1. The character string "PC 3" read out is deleted from the queue. Namely, when "PC 3" is read out, the data in the head of the queue changes from "PC 3" to "PC 4." When a try at the data transmission to "PC 2" is completed, new data "PC 4" in the head of the queue is set in the entry area of the child task 2 (see (3) in FIG. 4). Here, it is assumed that the data transmission fails in the child task 1, and that the data transmission is successfully achieved in the child task 2. The destination "PC 3" to which the data transmission has failed in the child task 1 is added behind the last destination "PC 2" (in front of "Notify" in the queue (see (D) in FIG. 4.

When the data transmission to "PC 3" is completed, new data "PC 2" in the head of the queue is set in the entry area of the child task 1. The character string "PC 2" read out is deleted from the queue. When a try at the data transmission to "PC 4" is completed, new data "PC 3" in the head of the queue is set in the entry area of the child task 2 (see (4) in FIG. 4). Here, it is assumed that the data transmission is successfully achieved in the child task 1 and the child task 2. When the data transmission to "PC 2" is completed, the character string "Notify" is set in the entry area of the child task 1 (see (5) in FIG. 4). In the child task 1, an operation corresponding to the character string "Notify" (i.e., an operation of transmitting a report) is executed. Thus, a destination of a terminal device to which the data transmission has failed is added behind the last destination stored in the queue, that is, in front of "Notify" in the queue. When two or more child tasks are being executed, the task "Notify" is not executed in any of the child tasks until all tasks for the data transmission other than "Notify" in the queue are completed in the two or more child tasks.

1-6. Advantages of MFD

Advantages effected by the aforementioned processes of the MFD 10 are as follows.

(1) When failing in the data transmission to a terminal device, the MFD 10 tries the data transmission to all the other terminal devices, and thereafter retries the data transmission to the terminal device to which the data transmission has failed (S18).

(2) The MFD 10 selects a transmission method different from the method employed for an unsuccessful try at the data transmission to a terminal device, and retries the data transmission to the terminal device in the selected method (S78, S84, and S90).

(3) The MFD 10 stores, for each terminal device, a plurality of kinds of transmission methods in association with respective priorities. The MFD 10 selects a transmission method for retrying the data transmission in descending order of the priority (S78, S84, and S90). By retrying the data transmission in a transmission method different from the previous method, the MFD 10 can succeed in the data transmission with a smaller number of retries. The plurality of kinds of transmission methods selectable include transmission methods based on respective different transmission protocols (e.g., e-mail, FTP, and HTTP) and transmission methods with respective different data transfer routes (i.e., transmission methods with respective different data relay servers).

(4) When the data transmission fails due to the certification error, the MFD 10 retries the data transmission at least one time in the same transmission method as the method employed for the unsuccessful data transmission (S76, and S82). Especially, when the data transmission fails due to capacity shortage of the destination terminal device, the MFD 10 retries the data transmission in the same transmission method (regardless of the priority of the methods) after a predetermined time period has passed since the previous try (S72 and S76). This is because the capacity shortage can be expected to be resolved within the predetermined time period.

(5) When the transmission method employed for an unsuccessful try at the data transmission is a method that needs certification, the MFD 10 does not employ any other transmission method that needs certification (regardless of the methods) for a next try (S90). Thereby, it is possible to avoid unsuccessful retry at the data transmission repeated again due to the certification error.

(6) The MFD 10 changes the priority of the transmission method employed for successful data transmission to the highest priority (S60). Through the operation in S60, in a next data transmission process, the MFD 10 can first try the data transmission in the transmission method employed for previous successful data transmission.

(7) After completing the data transmission to all the destination terminal devices, the MFD 10 notifies a previously designated terminal device of the results of the data transmission (S20).

2. Second Embodiment

Figure 5:
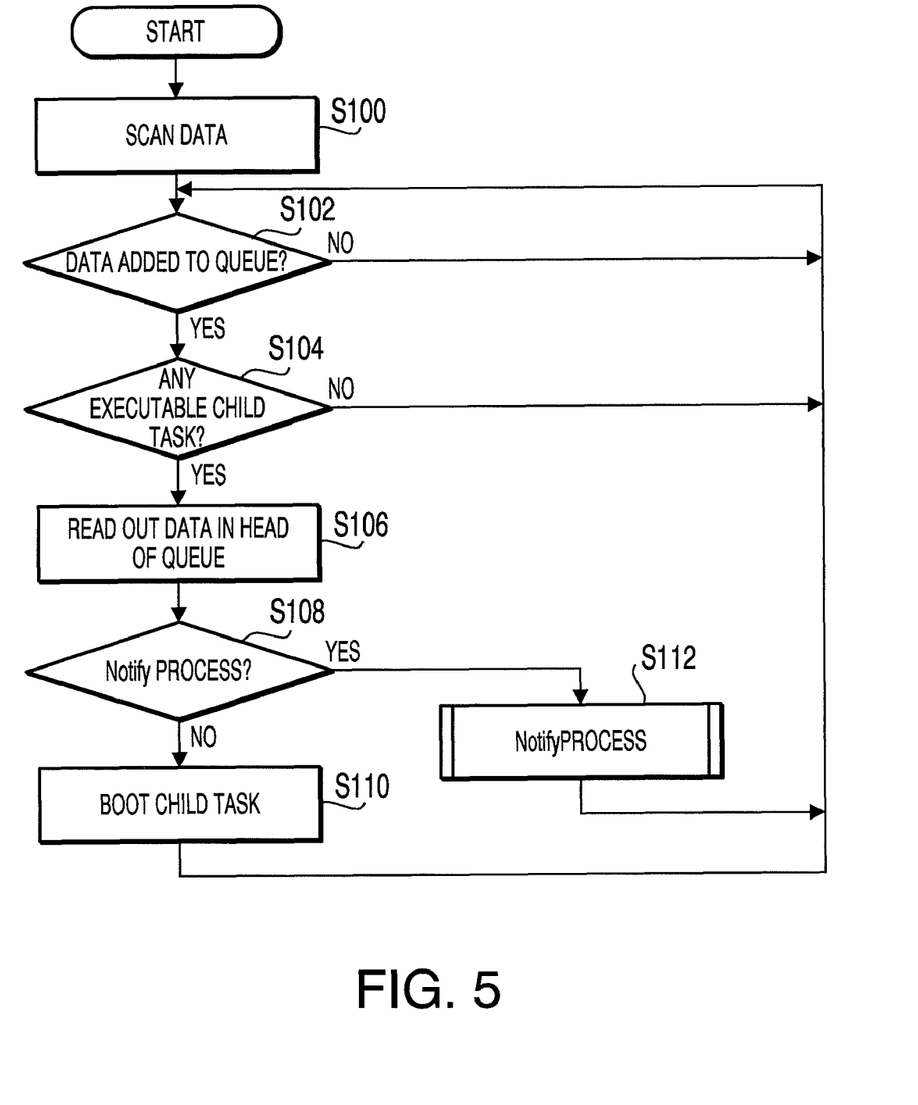
FIG. 5 is a flowchart showing a procedure of a main process to be executed by the MFD in a second embodiment according to one or more aspects of the present invention.
Figure 6:
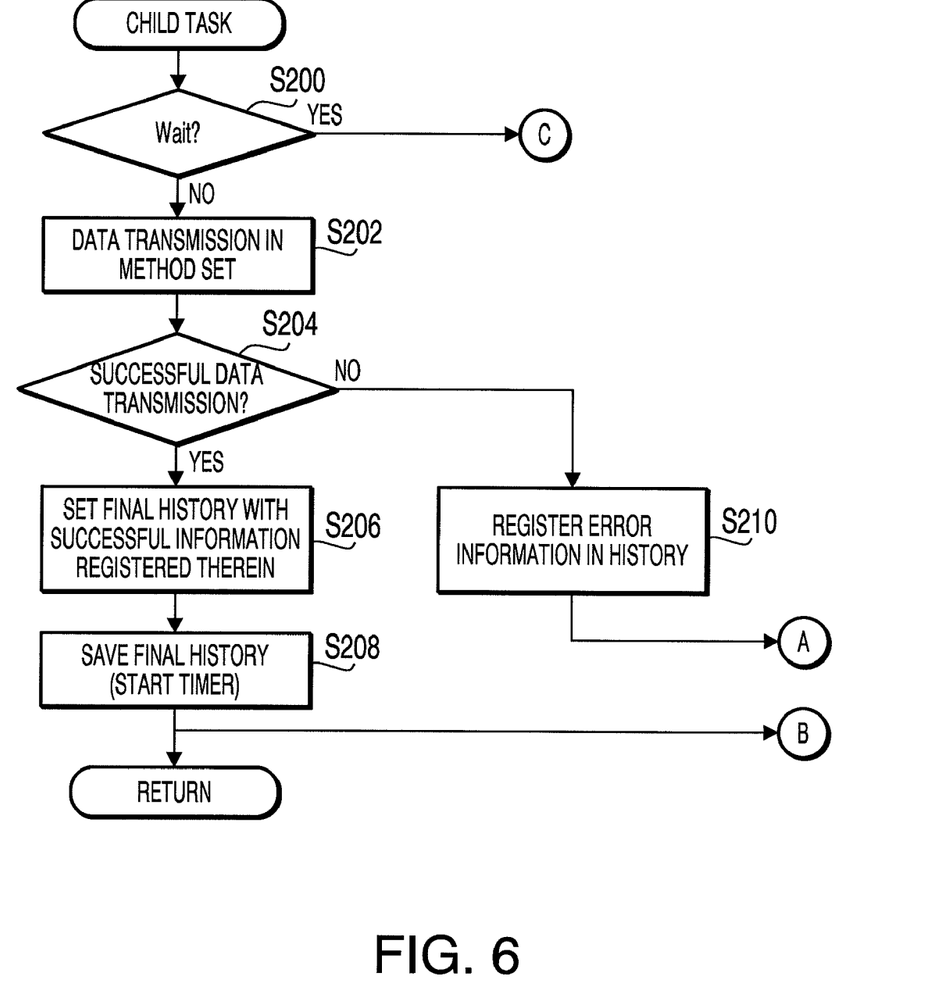
FIGS. 6, 7, and 8 are flowcharts showing a procedure of a child task in the second embodiment according to one or more aspects of the present invention.
Figure 7:
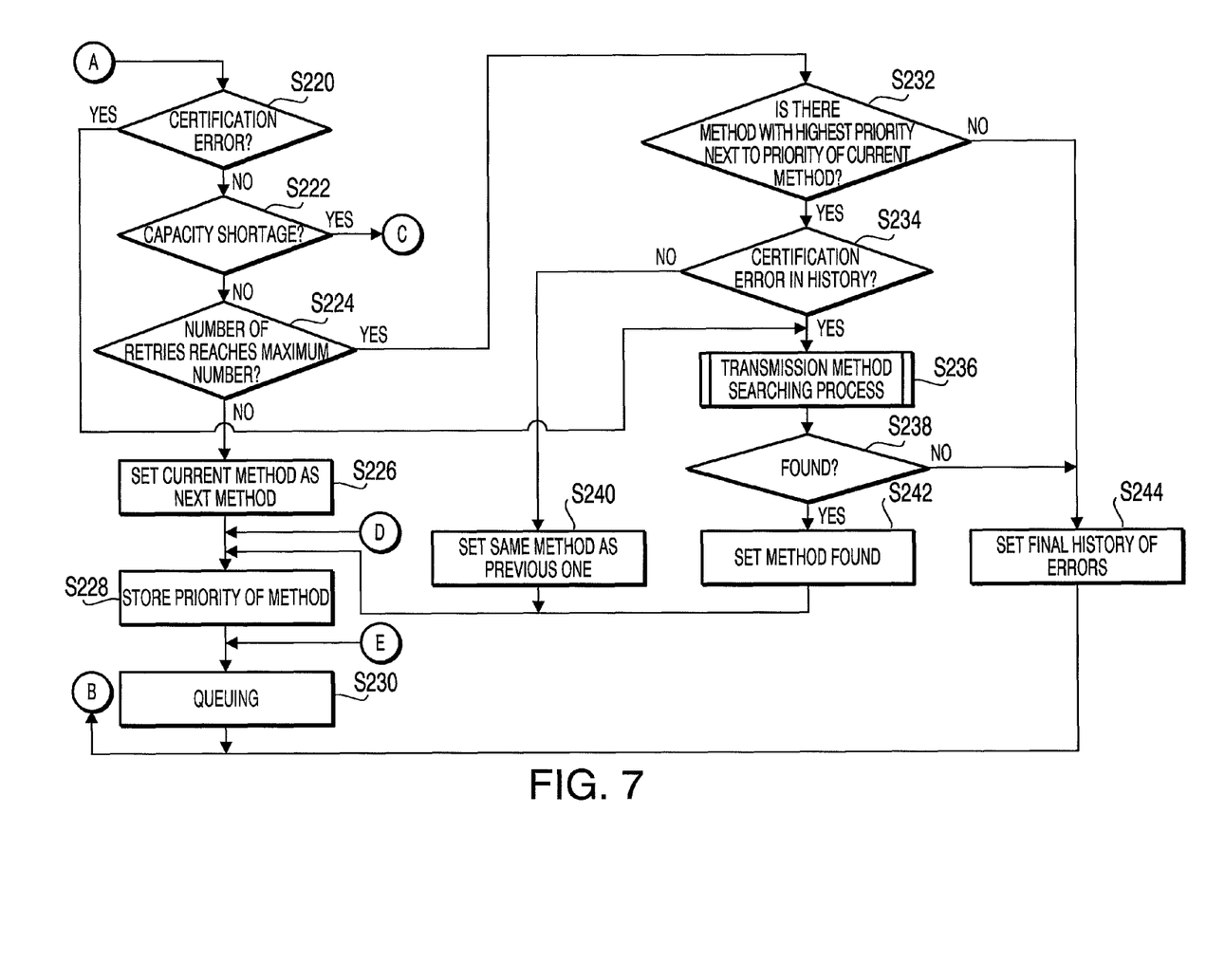
Figure 8:
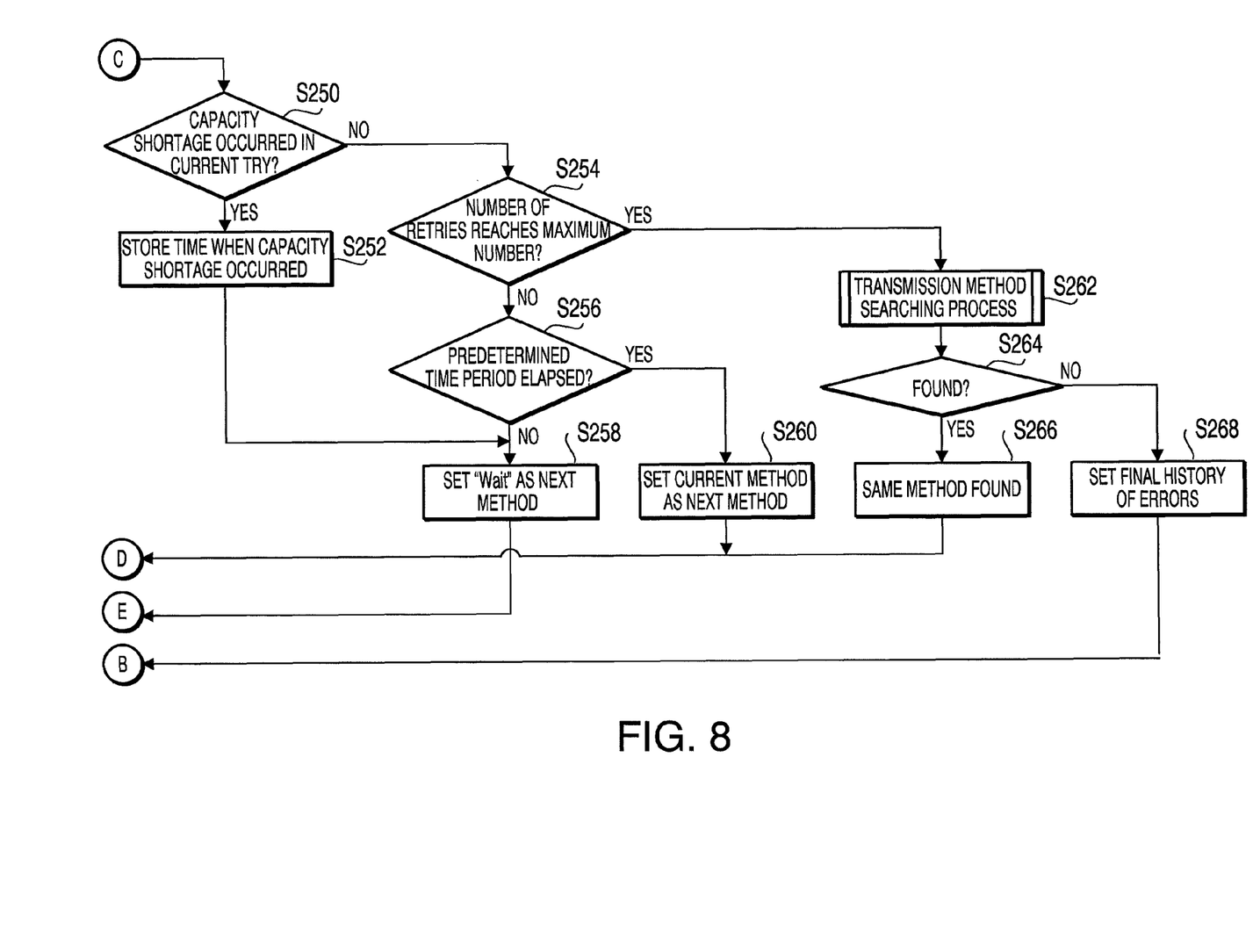
Figure 9:
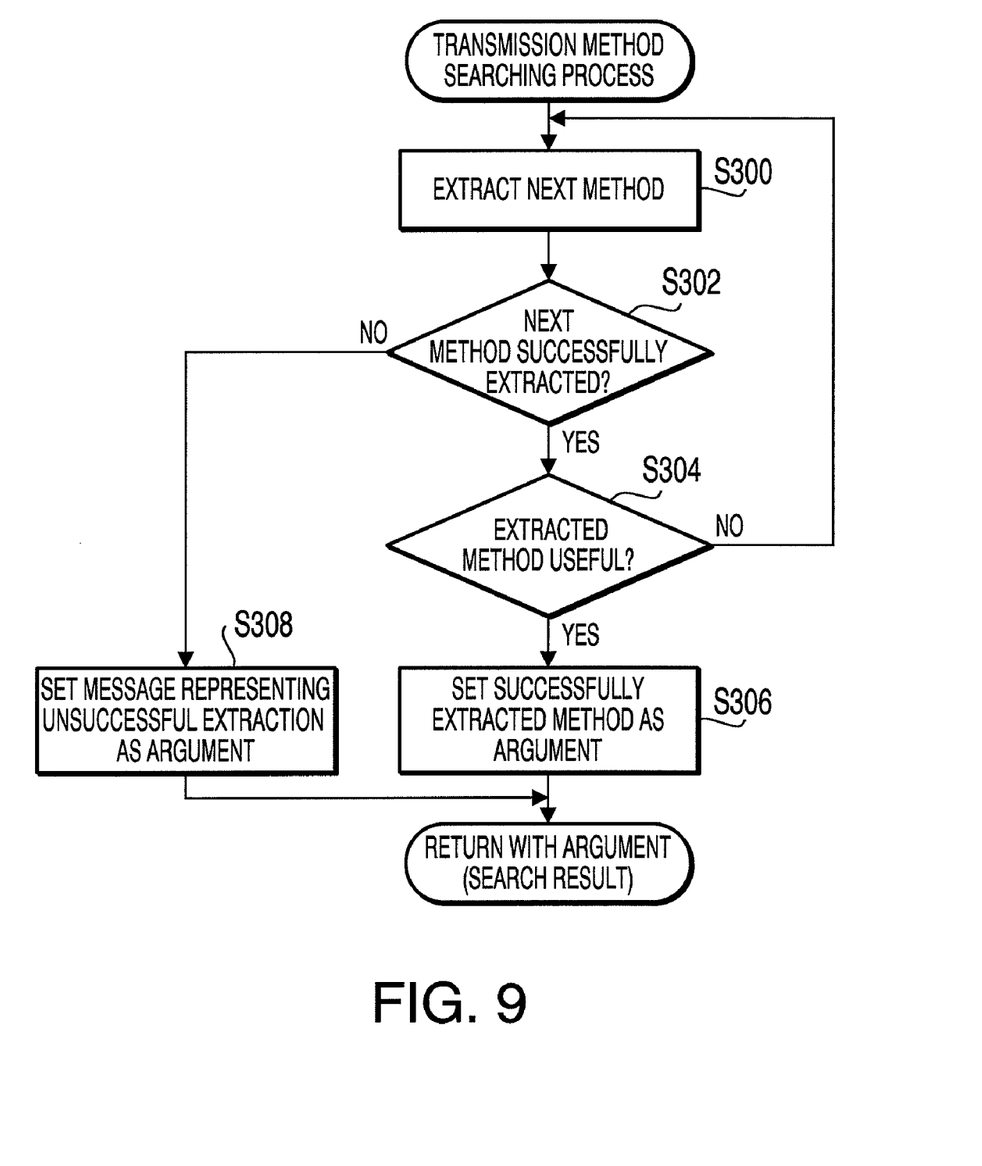
FIG. 9 is a flowchart showing a procedure of a transmission method searching process in the second the embodiment according to one or more aspects of the present invention.
Figure 10:
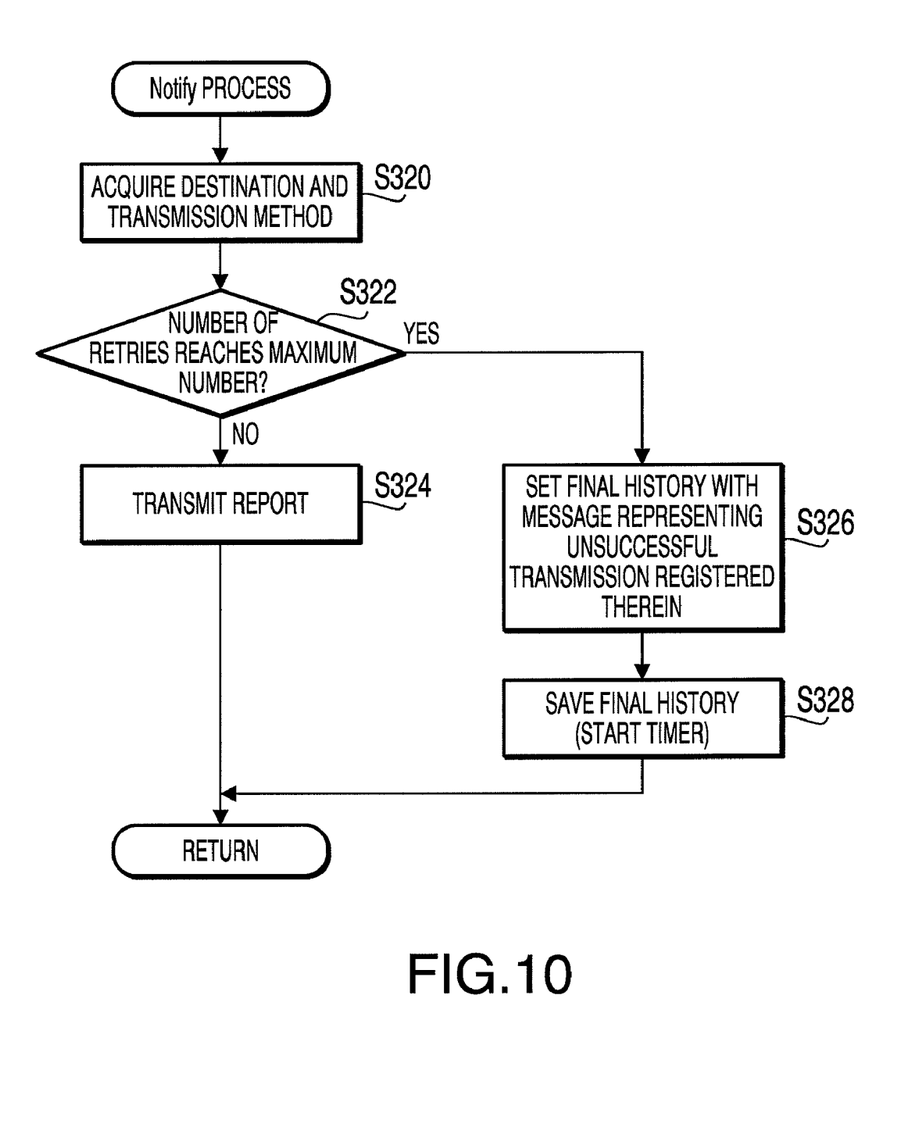
FIG. 10 is a flowchart showing a procedure of a Notify process in the second embodiment according to one or more aspects of the present invention.

Subsequently, an MFD of a second embodiment will be described. The MFD of the second embodiment is different from the MFD 10 of the first embodiment in processes to be executed. Hereinafter, the MFD of the second embodiment will be referred to as the MFD 10 in the same manner as the first embodiment. FIG. 5 is a flowchart of a main task to be executed by the MFD 10 in the second embodiment. FIGS. 6 to 8 are flowcharts showing a procedure of a child task to be booted from the main task. A data transmission task is executed in the child task. In other words, operations in the child task correspond to the data transmission task. FIGS. 9 and 10 are flowcharts of subroutines to be called from the main task or the child task. It is noted that, in the MFD 10 of the second embodiment, two or more child tasks are executed in a multitasking manner as illustrated in FIG. 4.

Referring to FIG. 5, the main task will be explained. The user issues an instruction to scan a document and designates the designations (PC 1 to PC 4) of the terminal devices to which data scanned is to be transmitted. When the user designates the destinations, a queue is created which includes the tasks indicated by (A) and (B) in FIG. 4. The MFD 10 scans image data of a document set, in accordance with the instruction to scan the document (S100). The MFD 10 determines whether data is added to the queue (S102). The step S102 is repeatedly executed until the MFD 10 determines that data is added to the queue (S102: Yes). When determining that data is added to the queue (S102: Yes), then the MFD 10 determines whether there is an executable child task (S104). When there is an executable task (S104: Yes), the MFD 10 reads out data in the head of the queue (S106). When the data in the head of the queue is "Notify" (S108: Yes), the MFD 10 performs a Notify process (S112). The Notify process is a process to transmit results of the data transmission to a predetermined terminal device. The Notify process will be described later.

Besides the destinations, information regarding the data transmission is stored in the queue in association with the destinations. The information stored in the queue is referred to as queue parameters. The queue parameters include a transmission method, the priority of the transmission method, and the data transmission history. It is noted that, just after the user designates a destination, a transmission method with the highest priority that is written in the Profile of the destination terminal device is set as a queue parameter.

Meanwhile, when the data in the head of the queue is not "Notify" (S108: No), namely, when the data read out of the queue is a destination, the MFD 10 sets the destination in the entry area of a child task and executes the child task (S10). The queue parameters are stored in the entry area as well as the destination. Namely, the data in the queue is copied to the entry area. In the child task, the data transmission task is executed based on the destination and the queue parameters. After booting the child task, the present process goes back to S102.

Referring to FIGS. 6 to 8, the child task (i.e., the data transmission task) in the second embodiment will be described. In the child task, it is first determined whether the transmission method set in the entry area is "Wait" (S200). The character string "Wait" may be set in the child task when the previous data transmission has failed due to capacity shortage of the terminal device. Conditions for "Wait" being set will be described later. When the transmission method set is not "Wait" (S200: No), The MFD 10 tries the data transmission in the transmission method set (S202). The data transmitted is the image data scanned in S100. Meanwhile, when the transmission method set is "Wait" (S200: Yes), the MFD 10 executes an operation in S250. "Wait" is a process to postpone a retry at the data transmission until a predetermined time period passes after failure in the data transmission. The operation in S250 will be described later with reference to FIG. 8. When the data transmission is successfully achieved (S204: Yes), the MFD 10 registers in the data transmission history that the data transmission has been successfully completed (S206). The MFD 10 saves the data transmission history updated (S208). Further, in S208, the MFD 10 makes a timer begins to measure a time period for saving the data transmission history. Meanwhile, when the data transmission fails (S204: No), the MFD 10 registers in the data transmission history error information such as an error code (S210). FIG. 7 shows a flowchart following S210.

When the data transmission fails due to the certification error (S220: Yes), a transmission method searching process is executed in which the MFD 10 searches a next transmission method with reference to the Profile (S236). The cause of failure in the data transmission is determined based on the error code registered in S210. In the transmission method searching process (S236), a transmission method with the highest priority next to the priority of the currently employed transmission method is searched in accordance with the order of priority written in the Profile of the destination terminal device. In the transmission method searching process, based on a rule depending on the type of an error, a transmission method with the next highest priority is searched. In other words, the transmission method searching process in S236 is performed in consideration of whether the current data transmission fails due to the certification error. It is noted that, in the transmission method searching process, an appropriate transmission method may not be found. The transmission method searching process will be described later with reference to FIG. 9. When a transmission method is found in the transmission method searching process (S238: Yes), the transmission method found is set (S242). Meanwhile, when a transmission method is not found in the transmission method searching process (S238: No), the MFD 10 sets the final history of errors (S244), and terminates the child task.

Referring back to S220 in FIG. 7, the explanation of the child task will be continued. When the current error is not the certification error (S220: No) but the error of capacity shortage of the destination terminal device (S222: Yes), the present process goes to the flowchart shown in FIG. 8. A process to be executed in the case of the capacity shortage error will be described later. When the current error is not the capacity shortage error (S222: No), namely, when the data transmission fails due to another communication error, the MFD 10 determines whether the number of retries at the data transmission to the same destination reaches a predetermined maximum number of times (S224). When the number of retries does not reach the predetermined maximum number of times (S224: No), the MFD 10 sets the current transmission method as a next transmission method (S226). Subsequently, the MFD 10 stores the priority of the transmission method set in S226 (S228). Then, for the next retry at the data transmission, the MFD 10 stores in the queue the queue parameters along with the destination of the terminal device to which the current data transmission has failed (S230). In S230, the destination and the queue parameters are inserted behind the last destination in the queue. In S230, the next transmission method set in S226, the priority stored in S228, and the error information registered in S210 are stored in the queue. In this case, the queue parameters are stored in the queue in association with the destination (the name of the destination terminal device). It is noted that, depending on the sort of the error, instead of S226, any of the steps S240, S242, S260, and S266 may be executed. When the steps S228 and S230 are executed following any of the steps S240, S242, S260, and S266, the transmission method set in any of the steps S240, S242, S260, and S266 and the priority of the transmission method are stored in the queue as queue parameters. In addition, when the data transmission fails due to the capacity shortage error (S222: Yes), the time when the capacity shortage error occurs is stored in S252. In the case of the capacity shortage error, the time when the error occurs is stored in the queue as a queue parameter.

Referring back to S224, the explanation of the present process will be continued. When the number of retries reaches the predetermined maximum number of times (S224: Yes), the MFD 10 determines, with reference to the Profile, whether there is a transmission method with the highest priority next to the priority of the currently employed transmission method (S232). When there is not a transmission method with the highest priority next to the priority of the currently employed transmission method (S232: No), the final history of errors are set (S244), and the child task is terminated. Meanwhile, when there is a transmission method with the highest priority next to the priority of the currently employed transmission method (S232: Yes), the MFD 10 determines, with reference to the data transmission history, whether there is a record of the certification error in the data transmission history (S234). When there is not a record of the certification error (S234: No), the MFD 10 sets the same transmission method as the previously employed one (S240). As mentioned before, when the step S240 is executed, the transmission method set in S240 is stored in the queue in association with the destination (S230). Meanwhile, when there is a record of the certification error (S234: Yes), namely, when the certification error has ever occurred, the present process goes to S236. The operations of S236 and the steps following S236 are as described above.

Referring back to S222, the explanation of the present process will be continued. When the capacity shortage error has occurred (S222: Yes), the present process goes to the flowchart shown in FIG. 8. When the capacity shortage error has occurred in the current try at the data transmission (S250: Yes), the MFD 10 stores the time when the capacity shortage error has occurred (S252). Then, the MFD 10 sets "Wait" as a next transmission method (S258). Subsequently, the MFD 10 stores in the queue "Wait" set in S258 (S230). Meanwhile, when the capacity shortage error has occurred (not in the current try at the data transmission but) in the previous try at the data transmission (S250: No), the MFD 10 determines whether the number of retries at the data transmission to the same destination reaches a predetermined maximum number of times (S254). When the number of retries at the data transmission to the same destination does not reach a predetermined maximum number of times (S254: No), the MFD 10 calculates an elapsed time period until now since the time when the capacity shortage error has occurred (stored in S252) (S256). When the elapsed time period is shorter than a predetermined threshold (S256: No), the MFD 10 sets "Wait" as a next transmission method (S258), and goes to S230. When "Wait" is stored in the queue, the data transmission is not carried out in the next retry (see S200 in FIG. 6). This is because it is highly likely that the capacity shortage error is not resolved until a predetermined time period. When a predetermined time period has elapsed since the time when the capacity shortage error occurred (S256: Yes), the MFD 10 sets the current transmission method as a next method (S260). The transmission method set in S260 is stored in the queue.

When it is determined in S254 that the number of retries reaches the predetermined maximum number of times (S254: Yes), the MFD 10 searches a next transmission method (S262). In a transmission method searching process in S262, in the same manner as the transmission method searching process in S236, a transmission method with the highest priority next to the priority of the current transmission method is searched in accordance with the order of priority written in the Profile of the destination terminal device. In this respect, however, the step S262 is executed on the ground that the previous error was the capacity shortage error. When a next transmission method is found in the process of S262 (S264: Yes), the MFD 10 sets the transmission method found (S266). The transmission method set in S266 is stored in the queue to prepare for the next retry (S230). Meanwhile, when a next transmission method is not found in S264 (S264: No), the MFD 10 registers the final error history and terminates the child task (S268).

Next, the transmission method searching process to be executed in S236 or S262 in the child task will be described. FIG. 9 is a flowchart showing a procedure of the transmission method searching process. The MFD 10 extracts, with reference to the Profile of the destination terminal device, a transmission method to which the highest priority next to the priority of the current transmission method is assigned (S300). When the current transmission method is a transmission method of the lowest priority, or when only one transmission method is written in the Profile, the MFD 10 fails in extracting a next transmission method. When the MFD 10 fails in extracting a next transmission method (S302: No), the MFD 10 terminates the transmission method searching process with a message set as an argument which message represents that any transmission method has not been found (S308). When the MFD 10 successfully extracts a next transmission method (S302: Yes), the MFD 10 determines whether the transmission method extracted is useful (S304). The determination in S304 is made as follows, based on what the cause of the failure in the data transmission is, referring to the data transmission history.

(1) In the case of the certification error: when the transmission method extracted needs certification, the MFD 10 determines that the method is "not useful." Meanwhile, when the transmission method extracted does not need certification, the MFD 10 determines that the method is "useful." This is because after the certification error has occurred, even another transmission method that needs certification is highly likely to fail in the data transmission again.

(2) In the case of the capacity shortage error: When the transmission method extracted is a method for transmitting data directly to the terminal device, the MFD 10 determines that the method is "not useful." Meanwhile, when the transmission method extracted is a method for transmitting data indirectly to the terminal device, the MFD 10 determines that the method is useful. The method for transmitting data indirectly includes a transmission method via a server and a transmission method via an e-mail.

When the transmission method extracted is determined to be "useful" (S304: Yes), the MFD 10 terminates the transmission method searching process with the extracted transmission method set as an argument (S306). Meanwhile, when the transmission method extracted is determined to be "not useful" (S304: No), the MFD 10 goes back to S300 in which the MFD 10 extracts a transmission method to which the highest priority next to the priority of the current transmission method is assigned, and repeatedly performs the aforementioned operations.

Finally, the Notify process executed in S112 in FIG. 5 will be described. FIG. 10 is a flowchart showing a procedure of the Notify process. Referring to the Profile, the MFD 10 acquires information regarding the destination terminal device of the transmission result report (the data transmission history) (S320). The information regarding the destination terminal device contains a destination and a transmission method of the report. When the number of retries at the report transmission does not reach a predetermined maximum number of times (S322: No), the MFD 10 transmits the report in the transmission method acquired in S320 (S324). When the number of retries at the report transmission reaches the predetermined maximum number of times (S322: Yes), the MFD 10 registers in the final history a message that the report has not been successfully transmitted (S326). The MFD 10 finally saves the final history registered (S328). Further, in S328, the MFD 10 makes a timer begins to measure a time period for saving the final history.

The MFD 10 of the second embodiment has the following advantages.

(1) The operation of adding to the queue the destination of a terminal device to which the data transmission has failed is executed (S230). Child tasks can be booted from the main task in sequence (S110). Accordingly, the MFD 10 can make a try at the data transmission to a next destination in parallel with operations in the case of an error. Thereby, the data transmission process can be made more efficient.

(2) In a child task in which the data transmission has failed, a next transmission method is determined (S226, S240, S242, S260, and S266). In other words, when having failed in the data transmission, the MFD 10 determines a transmission method for a retry at the data transmission prior to the data transmission to a destination stored in the new head of the queue. Therefore, since it is not required to determine a transmission method at the time of the retry at the data transmission, the retry at the data transmission can be performed rapidly.

(3) When adding to the queue the destination of a terminal device to which the data transmission has failed, the MFD 10 stores in the queue a next transmission method in association with the destination (S230). In the child task, the MFD 10 can make a retry at the data transmission only by referring to the data stored in the queue. Thus, in the child task, since the MFD 10 does not need to refer to any other data, the operations can be done more rapidly.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A data transmission device configured to connect with a plurality of terminal devices via a network, comprising:
    a data transmission unit configured to transmit data sequentially to the plurality of terminal devices based on a queue that stores destinations of each of the plurality of terminal devices;
    a determining unit configured to determine a transmission method for transmitting the data to each of the plurality of terminal devices; and
    a controller configured to, when the data transmission unit fails to transmit the data to a first terminal device of the plurality of terminal devices in a first transmission method, control the determining unit to determine a second transmission method for retrying to transmit the data to the first terminal device, and control the data transmission unit to retry transmitting the data to the first terminal device via the second transmission method after the data transmission unit tries to transmit the data to terminal devices to which the data has not been successfully transmitted among the plurality of terminal devices other than the first terminal device, wherein the data transmission device further comprises a queue updating unit configured to update the queue to add, behind a last destination stored in the queue, the destination of the first terminal device to which the data transmission unit fails to transmit the data in the first transmission method.

2. The data transmission device according to claim 1, wherein the second transmission method is different from the first transmission method in at least one of a transmission protocol and a data transfer route.

3. The data transmission device according to claim 1, wherein the controller is configured to, when the data transmission unit fails to transmit the data to the first terminal device in the first transmission method, control the data transmission unit to retry to transmit the data to the first terminal device in the first transmission method at least one time, and wherein the controller is configured to, when the retry to transmit the data to the first terminal device in the first transmission method fails repeatedly a predetermined number of times, control the determining unit to determine the second transmission method different from the first transmission method, and control the data transmission unit to retry to transmit the data to the first terminal device in the second transmission method.

4. The data transmission device according to claim 1, further comprising a storage configured to store a plurality of transmission methods for each of the plurality of terminal devices in association with respective priorities of the transmission methods, wherein the determining unit is configured to select the second transmission method for the retry to transmit the data to the first terminal device from the plurality of transmission methods stored in the storage in descending order of the priorities.

5. The data transmission device according to claim 4, wherein the first transmission method is a method that requires certification for establishing communication with a destination terminal device, and wherein the determining unit is configured to, when the data transmission unit fails to transmit the data to the first terminal device in the first transmission method due to a certification error, control the determining unit to determine a transmission method that does not require the certification as the second transmission method.

6. The data transmission device according to claim 4, wherein the controller is configured to, when the data transmission unit fails to transmit the data to the first terminal device in the first transmission method due to capacity shortage of the first terminal device, control the transmission unit to retry to transmit the data to the first terminal device in the first transmission method after a predetermined time period has elapsed since the failure in the data transmission.

7. The data transmission device according to claim 3, wherein the controller is configured to, when the data transmission unit fails to transmit the data to the first terminal device in the first transmission method due to capacity shortage of the first terminal device, control the transmission unit to retry to transmit the data to the first terminal device in the first transmission method after a predetermined time period has elapsed since the failure in the data transmission.

8. The data transmission device according to claim 4, further comprising an updating unit configured to update a priority of a transmission method employed for successful data transmission to a highest priority.

9. The data transmission device according to claim 1, wherein the updating unit is configured to update the queue to add, behind the last destination stored in the queue, the second transmission method along with the destination of the first terminal device to which the data transmission unit fails to transmit the data in the first transmission method.

10. The data transmission device according to claim 1, further comprising a notifying unit configured to, after the data transmission unit completes tries to transmit the data to the plurality of terminal devices, notify a predetermined terminal device of a result of the tries to transmit the data to the plurality of terminal devices.

11. The data transmission device according to claim 1, wherein the network is a Local Area Network (LAN).

12. A method for transmitting data sequentially to a plurality of terminal devices via a network, the method comprising the steps of:

transmitting the data to a first terminal device of the plurality of terminal devices in a first transmission method based on a queue that stores destinations of each of the plurality of terminal devices;

determining a second transmission method for retrying to transmit the data to the first terminal device when the transmitting the data to the first terminal device in the first transmission method fails;

updating the queue to add, behind a last destination stored in the queue, the destination of the first terminal device to which the transmitting the data in the first transmission method fails; and retrying to transmit the data to the first terminal device via the second transmission method after trying to transmit the data to terminal devices to which the data has not been successfully transmitted among the plurality of terminal devices other than the first terminal device.

13. A computer readable medium storing computer-readable instructions therein that, when executed by a controller of a computer configured to connect with a plurality of terminal devices via a network instruct the controller to control the computer to perform the steps of:

transmitting data to a first terminal device of the plurality of terminal devices in a first transmission method based on a queue that stores destinations of each of the plurality of terminal devices;

determining a second transmission method for retrying to transmit the data to the first terminal device when the transmitting the data to the first terminal device in the first transmission method fails;

updating the queue to add, behind a last destination stored in the queue, the destination of the first terminal device to which the transmitting the data in the first transmission method fails; and retrying to transmit the data to the first terminal device via the second transmission method after trying to transmit the data to terminal devices to which devices the data has not been successfully transmitted among the plurality of terminal devices other than the first terminal device.

* * * * *